United States Patent Office 3,528,954
Patented Sept. 15, 1970

---

3,528,954
PROCESS FOR HOMOPOLYMERIZATION OF TETRAFLUOROETHYLENE AND COPOLYMERIZATION OF SAME WITH FLUORO CO-MONOMERS IN THE SOLVENT 1,1,2 - TRICHLORO - 1,2,2 - TRIFLUOROETHANE
Dana Peter Carlson, Wilmington, Del., assignor to E. I. du Pont de Nemours and Company, Wilmington, Del., a corporation of Delaware
No Drawing. Filed Oct. 30, 1967, Ser. No. 679,162
Int. Cl. C08f 15/06
U.S. Cl. 260—87.5                                    8 Claims

ABSTRACT OF THE DISCLOSURE

High molecular weight, tough and stable copolymers of tetrafluoroethylene can be polymerized in non-perfluorinated hydrogen and chlorine containing fluorocarbon solvents by a process that requires that the reaction be carried out at from about 30° C. to about 85° C. in the presence of a low temperature initiator such as bis-(perfluoropropionyl) peroxide. The homopolymer of tetrafluoroethylene can also be prepared in this solvent initiator system.

---

BACKGROUND OF THE INVENTION

This invention relates to the polymerization of tetrafluoroethylene monomer with olefin monomer in a saturated non-perfluorinated fluorocarbon solvent.

Prior to this invention, copolymers of tetrafluoroethylene with other perfluorinated and non-perfluorinated olefins and vinyl ethers such as hexafluoroethylene or perfluoropropyl perfluorovinyl ether were prepared in both aqueous and non-aqueous media.

In the aqueous copolymerization of tetrafluoroethylene with perfluorinated comonomers, acid end groups are formed which are unstable at extrusion temperatures, giving rise to bubbles or voids in the polymer. This is obviously undesirable. Several solutions to the problem were found, the first being a post-polymerization curing of the polymer polymerized in an aqueous medium by use of the humid heat-treatment process of U.S. Pat. No. 3,085,083, which converts the unstable acid end groups into stable $-CF_2H$ end groups. The major disadvantages of the humid heat-treatment are that it is slow and expensive. The other solution to the problem was to prepare the copolymers in a non-aqueous solvent which avoided the formation of the acid end groups.

In 1960 Bro reported that tetrafluoroethylene will react with all organic solvents containing hydrogen, chlorine, bromine as well as unsaturated carbon double bonds under polymerization conditions resulting in a low molecular weight polymer such as a wax or brittle solids (U.S. Pat. No. 2,952,669). The only compounds found that did not interfere with polymerization were liquid compounds having no unsaturation and being completely substituted with fluorine. The reason behind this conclusion appears to be that the $-CF_2 \cdot$ free radical group on the end of the growing polymer chain is highly reactive and will withdraw hydrogen, chlorine or bromine from a compound resulting in chain termination. It was then believed that to be able to carry out a successful polymerization of TFE to a homopolymer or a copolymer in a non-aqueous solvent it was necessary to use a perfluorinated solvent to prevent the reaction of the solvent with the monomer. Polymerizations in these solvents were very successful in preventing formation of acid end groups on the copolymers mentioned above. The major disadvantage of the perfluorinated solvents is that they are extremely expensive. Thus it is necessary to recover all of the solvent or else the process becomes very expensive. In practice it was found difficult to recover much more than 90–95% of the solvent so the non-aqueous process using perfluorinated solvents was very costly and did not lead to an economical process.

SUMMARY OF THE INVENTION

The invention consists of polymerizing a solution of tetrafluoroethylene and olefin monomers in certain relatively inexpensive non-perfluorinated fluorocarbon solvents by initiating the reaction of the olefin monomers with low temperature initiators soluble in the solvent-monomer solution and polymerizing said solution at temperatures below about 85° C.

The process by which fluoro-olefin monomers can be polymerized in non-perfluorinated fluorocarbon solvents is as follows:

(a) A suitable non-perfluorinated fluorocarbon solvent is charged into a stirred autoclave.

(b) Tetrafluoroethylene or tetrafluoroethylene and a olefin monomer are charged into the non-perfluorinated fluorocarbon solvent.

(c) The solution of step (b) is then adjusted to polymerization temperature and tetrafluoroethylene is charged to bring up the pressure in the system so the ratio of TFE dissolved in the solvent to monomer dissolved in the solvent is the desired proportion.

(d) A low temperature initiator is then charged to the autoclave in a solution of the non-perfluorinated fluorocarbon solvent.

(e) The pressure in the reactor is maintained throughout the reaction by continuously adding monomers to the autoclave to maintain the pressure and co-monomer ratio.

(f) The reaction is then allowed to proceed until the desired degree of polymerization has been reached. The autoclave is then dumped and the solvent is flashed from the polymer and recovered.

Suitable solvents for the process are commercially available chlorofluoroalkanes and some chlorofluorohydroalkanes having from 1–4 carbon atoms and preferably 1–2 carbon atoms. The solvents may be chlorofluoroalkanes in which each carbon atom is substituted by at least one fluorine atom. Said chlorofluoroalkanes may also contain a maximum of one hydrogen atom per carbon atom if the hydrogen is present only in the difluoromethyl grouping ($-CF_2H$). Suitable solvents must be liquid at polymerization conditions. Examples of suitable solvents are as follows: $CCl_2F_2$, $CCl_3F$, $CClF_2H$, $CCl_2FCCl_2F$, $CCl_2FCClF_2$ and $CClF_2CClF_2$. These compounds are sold under the trade names "Freon" 12, "Freon" 11, "Freon" 22, "Freon" 112, "Freon" 113 and "Freon" 114, respectively. The preferred solvent is "Freon" 113.

The process can be used in polymerization of tetrafluoroethylene and copolymerization of tetrafluoroethylene with a number of co-monomers. One or more of the co-monomers can be copolymerized or terpolymerized with tetrafluoroethylene to produce a co- or ter-polymer. Any monomer which is copolymerizable with tetrafluoroethylene monomer and which is soluble in the solvent under polymerization conditions can be used. Examples of preferred monomers which can be copolymerized with tetrafluoroethylene are as follows: ethylene; isobutylene; vinylidine fluoride; fluoro-olefins having the general formula $XCF_2(CF_2)_nCF=CF_2$ where X=F or H and $n$ is equal to 0–9 such as hexafluoropropylene, perfluoropentene-1, 8 hydroperfluorooctene-1; fluorovinyl ethers having the general formula $XCF_2(CF_2)_nOCF=CF_2$ where X=F or H and $n=0$–7 such as perfluoromethyl perfluorovinyl ether, perfluoroethyl perfluorovinyl ether, perfluoropropyl perfluorovinyl ether and 3-hydroperfluoropropyl perfluorovinyl ether; fluorovinyl polyethers having the general formula:

where X=F or H and $n$=0–7; perfluoro-3,6-dioxa-4-methyl-7-octene sulfonyl fluoride; and perfluoro(2-methylene-4-methyl-1,3-dioxolane).

Initiators suitable for the process must be soluble in fluorocarbon solvents and have high activity between about 45° C. and 80° C. Also the initiators must give radicals which will result in stable end groups on the polymer chain. Fluorocarbon acyl peroxides are suitable initiators in that they meet the requirements stated above. Fluorocarbon acyl peroxides which are suitable for use in the process are represented by the formula:

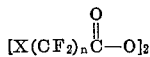

where X=H or F and $n$=1–10. The preferred initiator is bis(perfluoropropionyl) peroxide. In the preparation of some tetrafluoroethylene copolymers which are not perfluorinated such as the tetrafluoroethylene/ethylene copolymer, an initiator which will provide a perfluorocarbon end group is not necessarily required. In these cases, other low temperature initiators may be used than those mentioned. Azobis-isobutyronitrile is an example of an alternative initiator for the tetrafluoroethylene/ethylene polymerization. A low temperature initiator must be used because the temperature of the polymerization system should not go over about 85° C., because above 85° C. the solvent will act excessively as a telomerizing agent, terminating polymer chains and creating low molecular weight polymers.

The temperature range in which this process is to be carried out is 30–85° C., and preferably 45–65° C. The reaction should be carried out at pressures from about 15 to about 1000 p.s.i.g., the preferred pressure range being from about 50 to about 500 p.s.i.g. The temperature can be controlled by any conventional heat removal system.

High rates of polymerization with most co-monomers can be achieved at temperatures in the range of 30–85° C. in the initiator-solvent systems of the present invention in a matter of a few hours, and usually in less than an hour in both batch and continuous processes.

A tough polymer is defined as a polymer that can be molded into a thin film, which can be bent 180° without breaking.

The foregoing process will be exemplified in the following examples:

EXAMPLE I

Into an evacuated, agitated 1 liter stainless steel pressure vessel were placed 800 ml. of 1,1,2-trichloro-1,2,2-trifluoroethane ("Freon" 113 or F–113) and 60 gm. of perfluoropropyl perfluorovinyl ether (PPVE). The temperature of the mixture was raised to 40° C. and tetrafluoroethylene was added to make the total pressure 50 p.s.i.g. To the clave was then added 20.2 gm. of a 1.5 wt. percent solution of bis(perfluoropropionyl) peroxide initiator (3-P) in HFP cyclic dimer. The temperature of the reactor was kept at 40° C. by circulating water in the jacket of the reactor and conventional control elements. The pressure was kept constant by continuous TFE addition. After 43 minutes, the pressure was vented and the clave contents were removed and dried 1 hour at 200° C. under less than 1 mm. Hg pressure. The dried polymer weighed 49 gm. and had a melt viscosity at 380° C. of 45.5×10⁴ poises. An infrared analysis procedure used to measure the comonomer content showed that the polymer contained 8 wt. percent of PPVE. Compression molded films made at 340° C. were tough.

EXAMPLE II

Example 1 was repeated using 42.7 gm. of the 3–P initiator solution. The run time was 42 minutes and the dry polymer weight was 51 gm. The polymer contained 8.9 wt. percent PPVE and had a melt viscosity of 2.7×10⁴ poises. Tough polymers were made by compression molding at 340° C.

EXAMPLE III

Example I was repeated using 900 ml. of F–113, 59.4 gm. of PPVE, 10 gm. of 3-P initiator solution, 74 p.s.i.g. and 50° C. The run time was 30 minutes and 47 gm. of polymer were recovered. The PPVE content was 5.2 wt. percent and the melt viscosity was 211×10⁴ poises.

EXAMPLE IV

Example I was repeated using 860 ml. of F–113, 16.5 gm. of PPVE, 4 ml. of 3–P solution (0.0025 gm./ml. in F–113) 90 p.s.i.g. and 90° C. One minute after adding the initiator and every minute during the run, 0.006 gm. of 3-P was added. After twenty minutes, the run was dumped and the polymer was dried at 100° C. for 16 hours in an air oven. The dried polymer weighed 75.8 gm., contained 2.9 wt. percent of PPVE and had a melt viscosity of 2.6×10⁴ poises.

EXAMPLE V

Example I was repeated using 860 ml. of F–113, 9.0 gm. of PPVE, 0.65 gm. of 3–P, 25 p.s.i.g., and 50° C. After 16 minutes, the polymer was removed from the reactor and dried at 100° C. for 16 hours in an air oven. The dried polymer weighed 72.1 gm., contained 2.73 wt. percent PPVE and had a melt viscosity of 17.9×10⁴ poises. Compression molded samples at 340° C. were found to have a yield strength of 1910 p.s.i., an ultimate tensile strength of 4450 p.s.i., an ultimate elongation of 340% and a flex modulus of 112,000 p.s.i. A similarly molded sample had an MIT flex life of 73,000.

EXAMPLE VI

Example I was repeated using 860 ml. of trichlorofluoromethane ("Freon" 11), 28 gm. of PPVE, 0.025 gm. of 3-P initiator, 70 p.s.i.g. and 50° C. After 45 minutes, the run was terminated and the polymer recovered and dried at 100° C. for 16 hours in an air oven. The dried polymer weighed 71.2 gm., contained 2.1 wt. percent PPVE, and had a melt viscosity of 61.7×10⁴ poises. Tough films were made by compression molding at 340° C.

EXAMPLE VII

Example I was repeated using 900 ml. of F–113, 0.01 gm. of 3–P initiator, 30 p.s.i.g. and 50° C. The run was dumped after 65 minutes and 50 gm. of polymer were recovered after drying for 16 hours at 100° C. in an air oven. Tough films were produced by compression molding at 340° C.

EXAMPLE VIII

Example I was repeated using 860 ml. of F–113, 20 gm. of PPVE, 0.0375 gm. bis(ω-hydroperfluorovaleryl) peroxide, 60 p.s.i.g. and 50° C. The run time was 42 minutes and 52 gm. of polymer were recovered after drying for 16 hours at 100° C. in an air oven. It contained 1.4 wt. percent PPVE and had a melt viscosity of 10.5×10⁴ poises. Tough films were produced by compression molding at 340° C.

EXAMPLE IX

Into a 1 liter autoclave as described in Example 1 were placed 800 ml. F–113 and 4.0 ml. of cyclohexane. The temperature of the mixture was raised to 60° C. and the agitator speed was set at 500 r.p.m. To the mixture was charged tetrafluoroethylene and ethylene in such a proportion to make the composition of the gas phase in the reactor 74±1 mole percent tetrafluoroethylene of the tetrafluoroethylene-ethylene mixture at a total pressure of 90 p.s.i.g. To the autoclave was then added 10 ml. of 3-P solution in F-113 (concentration of 0.0025 gm./ml.). The pressure was kept constant as was the concentration of tetrafluoroethylene by continuous addition of a mixture of tetrafluoroethylene and ethylene. Every 10 minutes an additional 3 ml. of the above initiator solution was charged to the autoclave. This reaction was continued for a total of 60 minutes at the end of which time the contents of the autoclave were discharged into a large stainless steel beaker. The solvent was evaporated from the polymer by heating the product in an air oven at 125° C. overnight. The dry polymer weighed 45.4 grams and had a melt viscosity at 300° C. of $1.5 \times 10^4$ poises. Analysis of the copolymer showed that it contained 51.9 mole percent tetrafluoroethylene. Compression molded films at 310° C. were tough. The tensile strength was 5080 p.s.i. with 185% elongation at break. The tensile modulus was 141,000 p.s.i. The melting point of the copolymer by differential thermal analysis was 277° C. Heating of the polymer for 1 hour at 300° C. in vacuum did not cause any discoloration.

EXAMPLE X

Example IX was repeated except the reactor was charged with a mixture of tetrafluoroethylene and ethylene such that the composition of the gas phase of the reaction mixture was $69 \pm 1$ mole percent tetrafluoroethylene (based on tetrafluoroethylene-ethylene mixture). The reaction was carried out as before except that it was stopped after 40 minutes. The dry polymer weighed 32.5 grams and had a melt viscosity at 300° C. of $5.0 \times 10^4$ poises. Analysis of the polymer showed that it contained 50.2 mole percent tetrafluoroethylene. Compression molded films were tough. The melting point of the copolymer was 277° C.

EXAMPLE XI

Into a 350 ml., high pressure, stainless steel shaker tube was charged 7.4 gm. of perfluoropropyl perfluorovinyl ether (PPVE). The tube was cooled in a Dry Ice bath, evacuated and flushed 3 times with nitrogen. Then 258 gm. of chlorodifluoromethane ("Freon" 22) was condensed into the tube. The solution was heated to 60° C. (pressure was 340 p.s.i.g.) and tetrafluoroethylene (TFE) was added to bring the total pressure of the mixture to 440 p.s.i.g. While the tube was being shaken, 0.011 gm. 3-P in F-113 solution was added. After 60 minutes, a second portion of initiator solution equivalent to the first was added. TFE was added during the run to maintain the pressure of the reaction mixture at 440 p.s.i.g. The run was allowed to proceed for 2 hours. At the end of this time, the solvent was evaporated off and the polymer isolated and dried in a vacuum oven at 120° C. overnight. The recovered polymer weighed 50.7 grams and had a melt viscosity at 380° C. of $63.6 \times 10^4$ poises. The infrared procedure for analyzing the PPVE content of the copolymer showed that it contained about 1.0 wt. percent PPVE. Compression molded films of the copolymer were tough.

EXAMPLE XII

The apparatus of Example XI was used. Into the cooled, evacuated and purged (with nitrogen) shaker tube was charged 258 gm. of chlorodifluoromethane. The tube was heated to 60° C. and tetrafluoroethylene (66 p.s.i.) and ethylene (34 p.s.i.) were charged into the tube to bring the total pressure in the tube to 440 p.s.i.g. Then 0.011 gm. of 3-P was charged to the tube. After 1 hour, an additional 0.011 gm. of initiator was added as before. When the pressure in the tube dropped to 410 p.s.i.g., 15 p.s.i. tetrafluoroethylene (TFE) and 15 p.s.i. ethylene were added to bring the total pressure up to 440 p.s.i.g. The reaction was allowed to proceed for 2 hours and then the solvent was evaporated and the polymer recovered. The dried polymer weighed 8.8 grams and analyzed for 46.0 mole percent TFE. The melt viscosity at 300° C. was $3.45 \times 10^4$ poises. The polymer was white and compression molded films prepared at 310° C. were tough.

EXAMPLE XIII

Into the 1 liter autoclave described in Example I were placed 300 ml. of F-113 and 454 gm. of hexafluoropropylene (HFP). The mixture was heated to 60° C. and the agitator speed was set at 750 r.p.m. The autogenous pressure was 114.5 p.s.i.g. To the mixture was then charged tetrafluoroethylene to bring the total pressure of the system to 144.5 p.s.i.g. The autoclave was then charged with 40 ml. of a solution of 3-P solution in F-113 (concentration=0.0025 gm./ml.). TFE was continuously added during the run to maintain the pressure at 144.5 p.s.i.g. An additional 12 ml. of the initiator solution was added after 10 minutes and each 10 minutes thereafter until the reaction was terminated (60 minutes). The polymerization mixture was discharged from the autoclave and the polymer recovered. The dried polymer fluff weighed 66.7 grams and had a melt viscosity at 380° C. of $5.2 \times 10^4$ poises. An infrared analysis procedure to measure the comonomer content showed that the polymer contained 15.4 wt. percent HFP. A film pressed from the copolymer at 340° C. was tough.

EXAMPLE XIV

Into a one liter, stainless steel autoclave was charged a mixture of 750 gm. perfluoro-3,6-dioxa-4-methyl 7-octene sulfonyl fluoride (PSEPVE), 250 ml. F-113 and 0.3 gm. bis(3-hydroperfluoropropionyl) peroxide. The autoclave was evacuated and purged with nitrogen and then pressured to 50 p.s.i.g. with TFE. The agitator was started and the temperatrue was raised to 45° C. The autoclave pressure was raised to 130 p.s.i.g. and maintained at this pressure by the addition of more TFE. After 65 minutes reaction time, the autoclave was cooled and vented. The polymer slurry was discharged from the autoclave and the solvent and unreacted PSEPVE monomer were boiled off under vacuum. 140 gm. of copolymer was obtained which contained 40% by weight PSEPVE.

EXAMPLE XV

Into an evacuated 300 ml. shaker tube at −80° C. charge 160 ml. of trichlorotrifluoroethane, $CCl_2FCClF_2$, (F-113), 1.0 gm. of $(C_2F_5COO)_2$, 4.8 gm. of perfluoro(2-methylene-4-methyl-1,3-dioxolane), 16.5 gm. of perfluoropropyl perfluorovinyl ether and approximately 50 gm. of tetrafluoroethylene. Agitate the tube at a rate of 84, 12-inch strokes per minute while warming the tube to 44° C. at which temperature polymerization occurs rapidly with a sharp exotherm of less than 2 minutes.

There is obtained 55.5 gm. of polymer having a melt viscosity of about $1.07 \times 10^4$ poises at 380° C. Tough, transparent clear films may be compression molded from the copolymer at 300° C. and 600 p.s.i. By infrared spectroscopy the copolymer will contain about 8.5 wt. percent perfluoro(2-methylene-4-methyl-1,3-dioxolane) monomer units, about 6.3 wt. percent perfluoropropyl perfluorovinyl ether monomer units and about 85.2 wt. percent tetrafluoroethylene monomer units.

As many apparently widely different embodiments of this invention may be made without departing from the spirit or scope thereof, it is to be understood that this invention is not limited to the specific embodiments thereof except as defined in the appended claims.

What is claimed is:

1. A process for forming a tough polymer that can be molded into a thin film of a monomer selected from the group consisting of tetrafluoroethylene monomer and mixtures thereof with a co-monomer selected from the class consisting of comonomers having the formula $$XCF_2(CF_2)_nCF=CF_2$$

where X=F or H and n=0-9, fluorovinyl ethers having the formula $XCF_2(CF_2)_nOCF=CF_2$ where $X=F$ or $H$ and $n=0-7$, fluorovinyl polyethers having the formula:

where $X=F$ or $H$ and $n=0-7$, perfluoro-3,6-dioxa-4-methyl-7-octene sulfonyl fluoride and perfluoro(2-methylene-4-methyl-1,3-dioxolane) comprising the steps of:
  (a) forming a solution of tetrafluoroethylene monomer or mixtures thereof with said co-monomer in $CCl_2FCClF_2$;
  (b) initiating the polymerization with a low temperature initiator soluble in the solution of step (a);
  (c) polymerizing the monomer or monomer mixture in said solution at a temperature in the range of from about 30° C. to about 85° C. and at pressures in the range of from about 15 to about 1000 p.s.i.g.; and
  (d) separating the polymerized solution into a solvent-monomer fraction and a polymer fraction.

2. The process of claim 1 in which the initiator is a fluorocarbon acyl peroxide having the formula:

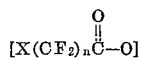

where $X=H$ or $F$ and $n=1-10$.

3. The process of claim 2 in which the polymerization temperature is in the range of about 45° C. to about 65° C., and the pressure is in the range of about 50 to about 500 p.s.i.g.

4. The process of claim 3 in which the co-monomer is perfluoroethyl perfluorovinyl ether and the initiator is bis(perfluoropropionyl)peroxide.

5. The process of claim 3 in which the co-monomer is perfluoropropyl perfluorovinyl ether and the initiator is bis(perfluoropropionyl)peroxide.

6. The process of claim 3 in which the co-monomer is perfluoro-3,6-dioxa-4-methyl-7-octene sulfonyl fluoride and the initiator is bis(perfluoropropionyl)peroxide.

7. The process of claim 3 in which the co-monomer perfluoro(2-methylene-4-methyl-1,3-dioxolane) and the initiator is bis(perfluoropropionyl)peroxide.

8. The process of claim 3 in which the co-monomer is hexafluoropropylene and the initiator is bis(perfluoropropionyl)peroxide.

References Cited
UNITED STATES PATENTS

| | | | |
|---|---|---|---|
| 2,952,669 | 9/1960 | Bro | 260—87.5 |
| 2,970,988 | 2/1961 | Lo | 260—87.7 |
| 3,342,777 | 9/1967 | Howard | 260—63 |

WILLIAM SHORT, Primary Examiner

L. L. LEE, Assistant Examiner

U.S. Cl. X.R.

260—88.3, 91.1, 92.1

PO-1050
(5/69)

UNITED STATES PATENT OFFICE
CERTIFICATE OF CORRECTION

Patent No. 3,528,954      Dated September 15, 1970

Inventor(s) Dana Peter Carlson AD-4266

It is certified that error appears in the above-identified patent and that said Letters Patent are hereby corrected as shown below:

Claim 2, line 24, the formula should read as follows:

$$[X(CF_2)_n\overset{O}{\overset{\|}{C}}-O]_2$$

SIGNED AND SEALED
JAN 19 1971

JAN. 19, 1971

(SEAL)
Attest:

Edward M. Fletcher, Jr.
Attesting Officer

WILLIAM E. SCHUYLER, JR.
Commissioner of Patents